(12) United States Patent
Thomson et al.

(10) Patent No.: US 11,216,526 B2
(45) Date of Patent: *Jan. 4, 2022

(54) SYSTEMS AND METHODS OF ONLINE INTERFACES FOR HIERARCHICALLY ARRANGED USER-GENERATED CONTENT

(71) Applicant: VERIZON PATENT AND LICENSING INC., Basking Ridge, NJ (US)

(72) Inventors: MacGregor James Thomson, Florence, MA (US); Thomas Biegeleisen, New York, NY (US); Siobhan Dooley, Scarsdale, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/402,856

(22) Filed: May 3, 2019

(65) Prior Publication Data

US 2019/0258692 A1 Aug. 22, 2019

Related U.S. Application Data

(63) Continuation of application No. 15/827,714, filed on Nov. 30, 2017, now Pat. No. 10,324,999, which is a
(Continued)

(51) Int. Cl.
*G06F 17/00* (2019.01)
*G06F 16/957* (2019.01)
(Continued)

(52) U.S. Cl.
CPC ........ *G06F 16/9577* (2019.01); *G06F 3/0485* (2013.01); *G06F 3/04842* (2013.01);
(Continued)

(58) Field of Classification Search
CPC .. G06F 16/9577; G06F 16/284; G06F 16/957; G06F 16/958; G06F 16/9558; G06F 3/04842; G06F 3/0485; H04L 67/02
See application file for complete search history.

(56) References Cited

U.S. PATENT DOCUMENTS

| | | | |
|---|---|---|---|
| 2008/0082607 A1* | 4/2008 | Sastry | G06F 16/986 709/204 |
| 2011/0191406 A1* | 8/2011 | Plunkett | G06F 15/16 709/203 |

(Continued)

OTHER PUBLICATIONS

International Preliminary Report on Patentability (IPRP) issued in corresponding International Application No. PCT/US2014/050053, dated Feb. 16, 2016.
(Continued)

*Primary Examiner* — Andrew T McIntosh (57) ABSTRACT

Systems and methods are provided methods for providing an online interface for displaying hierarchically or logically arranged user-generated content. One method including receiving, from a first user over a network, topical user-generated electronic content, the topical user-generated electronic content being related to a topic of a web page; displaying the topical user-generated electronic content received from the first user on the web page; receiving, from a second user over the network, responsive user-generated electronic content and an indication of a desire to post the responsive user-generated electronic content on the web page in association with the topical user-generated electronic content; and displaying, adjacent to the topical user-generated electronic content on the web page, a user element or link that a third user can manipulate to display the responsive user-generated electronic content adjacent to the topical user-generated electronic content.

20 Claims, 9 Drawing Sheets

Related U.S. Application Data continuation of application No. 14/453,812, filed on Aug. 7, 2014, now Pat. No. 9,864,814.

(60) Provisional application No. 61/865,458, filed on Aug. 13, 2013.

(51) Int. Cl.
  *G06F 16/28* (2019.01)
  *G06F 16/958* (2019.01)
  *G06F 16/955* (2019.01)
  *G06F 3/0484* (2013.01)
  *G06F 3/0485* (2013.01)
  *H04L 29/08* (2006.01)

(52) U.S. Cl.
  CPC .......... *G06F 16/284* (2019.01); *G06F 16/957* (2019.01); *G06F 16/958* (2019.01); *G06F 16/9558* (2019.01); *H04L 67/02* (2013.01)

(56) References Cited

U.S. PATENT DOCUMENTS

2013/0125058 A1   5/2013   Lee et al.
2013/0198677 A1*  8/2013   Dash .................... G06F 3/0488
                                                              715/776

OTHER PUBLICATIONS

International Search Report and Written Opinion issued in corresponding International Application No. PCT/US2014/050053, dated Dec. 10, 2014.

* cited by examiner

SYSTEMS AND METHODS OF ONLINE INTERFACES FOR HIERARCHICALLY ARRANGED USER-GENERATED CONTENT

CROSS-REFERENCE TO RELATED APPLICATIONS

This application is a continuation of and claims the benefit of priority to U.S. application Ser. No. 15/827,714, filed Nov. 30, 2017, which is a continuation of and claims the benefit of priority to U.S. application Ser. No. 14/453,812, filed Aug. 7, 2014, which claims the benefit of priority to U.S. Provisional Application No. 61/865,458, filed on Aug. 13, 2013, the entireties of which are incorporated by reference herein.

TECHNICAL FIELD

Various embodiments of the present disclosure relate generally to processing electronic messages, such as over the Internet or other suitable electronic network. More specifically, particular embodiments of the present disclosure relate to systems and methods for processing and displaying user-generated content, such as comments submitted over the Internet.

BACKGROUND

Typically, online publishers, such as online media companies and other publishers of articles, stories, audio/visual programming, and other electronic content, provide online web page space and mechanisms for viewers to comment on, or otherwise interact with, that published content. Users may generate so called "user-generated content," which may be related to the subject matter of the publisher's content or other electronic content, or only slightly related to that content. The user-generated content may include textual narrative, opinions, facts, etc., and/or electronic recordings of video and/or audio. Likewise, the publisher's content may include any combination of textual narrative, opinions, facts, etc., and/or electronic recordings of video and/or audio. Users may interact with publisher's content and generate new, related content by interacting with web servers using one or more mobile or computer devices connected to the Internet.

Some articles attract significant user-generated content in the form of comments, which may sometimes appear in numbers too great for one person to browse through all of those comments. In addition, some user-generated comments may form a conversation, i.e., by replying to one another, and some conversations may be especially worth noting for their ability to invite more user interactions. The prevalent way to present comments is in order of recency (e.g., more recent comments on the top), sometimes causing other interesting of insightful comments to disappear. Because of how comments are typically displayed in sequential order and in un-nested conversations, it can be difficult for readers to identify important or interesting comments or conversations. In addition, replies to comments are often indented to show that the comment is a reply to another comment. If the reply is indented by, e.g., one unit or tab, then the reply might be a reply to an original or "parent" comment. If the reply is indented by, e.g., two or more units or tabs, then the reply might be a reply to another reply. Regardless of the number or combination of original comments, replies to original comments, and/or replies to replies, any or all of those comments and replies may be displayed in sequential order based on the timestamp of the comment or reply (i.e., the time when the commenting server received the comment or reply from the respective user). As a result, it can be difficult for readers of comments to determine when a comment is a reply, and to identify which comment or reply a particular reply is in response to. Web pages that have extensive commenting can become unmanageable for users to read, causing decreased user engagement and resulting disadvantages for advertising revenue.

Accordingly, a need exists for systems and methods for processing and displaying user-generated content, such as comments submitted over the Internet. More specifically, a need exists for systems and methods for processing user-generated content to generate interfaces of hierarchically arranged comments.

SUMMARY OF THE DISCLOSURE

Embodiments of the present disclosure include methods for providing an online interface for displaying hierarchically or logically arranged user-generated content. One method including receiving, from a first user over a network, topical user-generated electronic content, the topical user-generated electronic content being related to a topic of a web page; displaying the topical user-generated electronic content received from the first user on the web page; receiving, from a second user over the network, responsive user-generated electronic content and an indication of a desire to post the responsive user-generated electronic content on the web page in association with the topical user-generated electronic content; and displaying, adjacent to the topical user-generated electronic content on the web page, a user element or link that a third user can manipulate to display the responsive user-generated electronic content adjacent to the topical user-generated electronic content.

According to certain embodiments, systems are disclosed for providing an online interface for displaying hierarchically or logically arranged user-generated content. One system includes a memory device storing instructions for providing an online interface for displaying hierarchically or logically arranged user-generated content; and a processor configured to execute the instructions to perform a method of: receiving, from a first user over a network, topical user-generated electronic content, the topical user-generated electronic content being related to a topic of a web page; displaying the topical user-generated electronic content received from the first user on the web page; receiving, from a second user over the network, responsive user-generated electronic content and an indication of a desire to post the responsive user-generated electronic content on the web page in association with the topical user-generated electronic content; and displaying, adjacent to the topical user-generated electronic content on the web page, a user element or link that a third user can manipulate to display the responsive user-generated electronic content adjacent to the topical user-generated electronic content.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments; as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

In view of the challenges outlined above, systems and methods are disclosed for processing and displaying user-generated content, such as comments submitted over the Internet or other suitable electronic networks, including wired and/or wireless networks.

Figure 1:
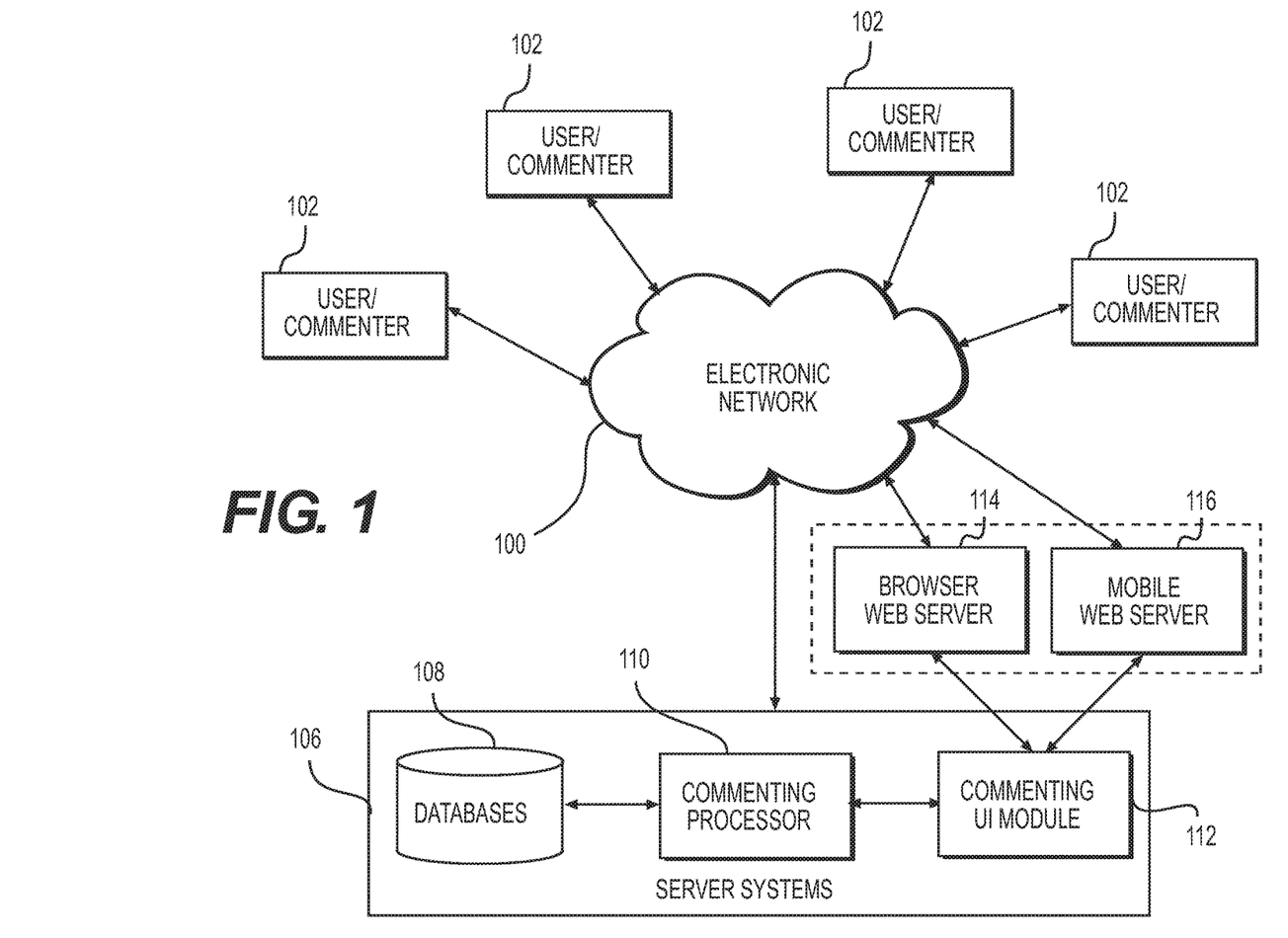
FIG. 1 is a schematic diagram of a network environment and system for processing and displaying user-generated content, according to an exemplary embodiment of the present disclosure.

FIG. 1 is a schematic diagram of an exemplary environment in which electronic messages and other user-generated content may be processed and displayed, according to an exemplary embodiment of the present disclosure. As shown in FIG. 1, the system and environment may include a plurality of user or commenter devices 102 disposed in communication with an electronic network 100. Electronic network 100 may be the Internet, or any other combination of wired and/or wireless electronic networks.

In one embodiment, each of user or commenter devices 102 may include a server, personal computer, tablet computer, mobile device, smartphone, and/or personal digital assistant ("PDA") disposed in communication with electronic network 100. For example, in one embodiment, each of the user or commenter devices 102 may be a touchscreen enabled device, such as an Apple iPad, Samsung Galaxy, Amazon Kindle, Microsoft Surface, or any other equivalent or similar device. Each of the user or commenter devices 102 may have a web browser, mobile browser, or other suitable application installed for receiving and displaying content from web servers. Thus, each of the user or commenter devices 102 may be configured to receive and display data that is received and processed, over electronic network 100.

As shown in FIG. 1, a plurality of server systems 106, a browser web server 114, and/or a mobile web server 116 may also be disposed in communication with electronic network 100. In one embodiment, server systems 106 may be configured to receive user-generated content, such as comments from users or commenter devices 102 over electronic network 100. Any of the devices or functionality of server systems 106, browser web server 114, and/or a mobile web server 116 may be combined together or separated, and may be operated by a single administrative entity, or outsourced to one or more other entities, such as a web hosting entity, web storage entity, and/or cloud computing service, possibly disposed remotely of each other.

As shown in the embodiment of FIG. 1, server systems 106 may include a commenting processor 110, which may be configured to analyze and execute methods and algorithms for arranging user-generated content, such as one or more comments received from user or commenter devices 102, based on a hierarchical or logical structure or interface. Server systems 106 may also include one or more databases 108, that store algorithms for generating hierarchically or logically arranged commenting interfaces, and where commenting processor 110 may be configured to store received user-generated content and/or results of executing the algorithms for generating hierarchically or logically arranged commenting interfaces. Any received data may be stored in the databases 108 in an encrypted form to increase security of the data against unauthorized access.

Server systems 106 may also include a commenting user interface (UI) module 112 that facilitates receiving user-generated content from users, displaying received user-generated content, and also displaying hierarchically or logically arranged commenting interfaces. For example, commenting UI module 112 may be configured to generate, render, and transmit to user or commenter devices 102 images of comments, possibly including textual data of comments, icons for "liking" or "favoriting" comments, displaying replies, displaying related comments, etc. Commenting UI module 112 also may be configured to update and transmit revised or updated commenting content, including lists of comments, featured comments, comments sorted based on a score, etc., as will be described herein and with respect to the exemplary screenshots of FIGS. 3A-8.

Figure 2:
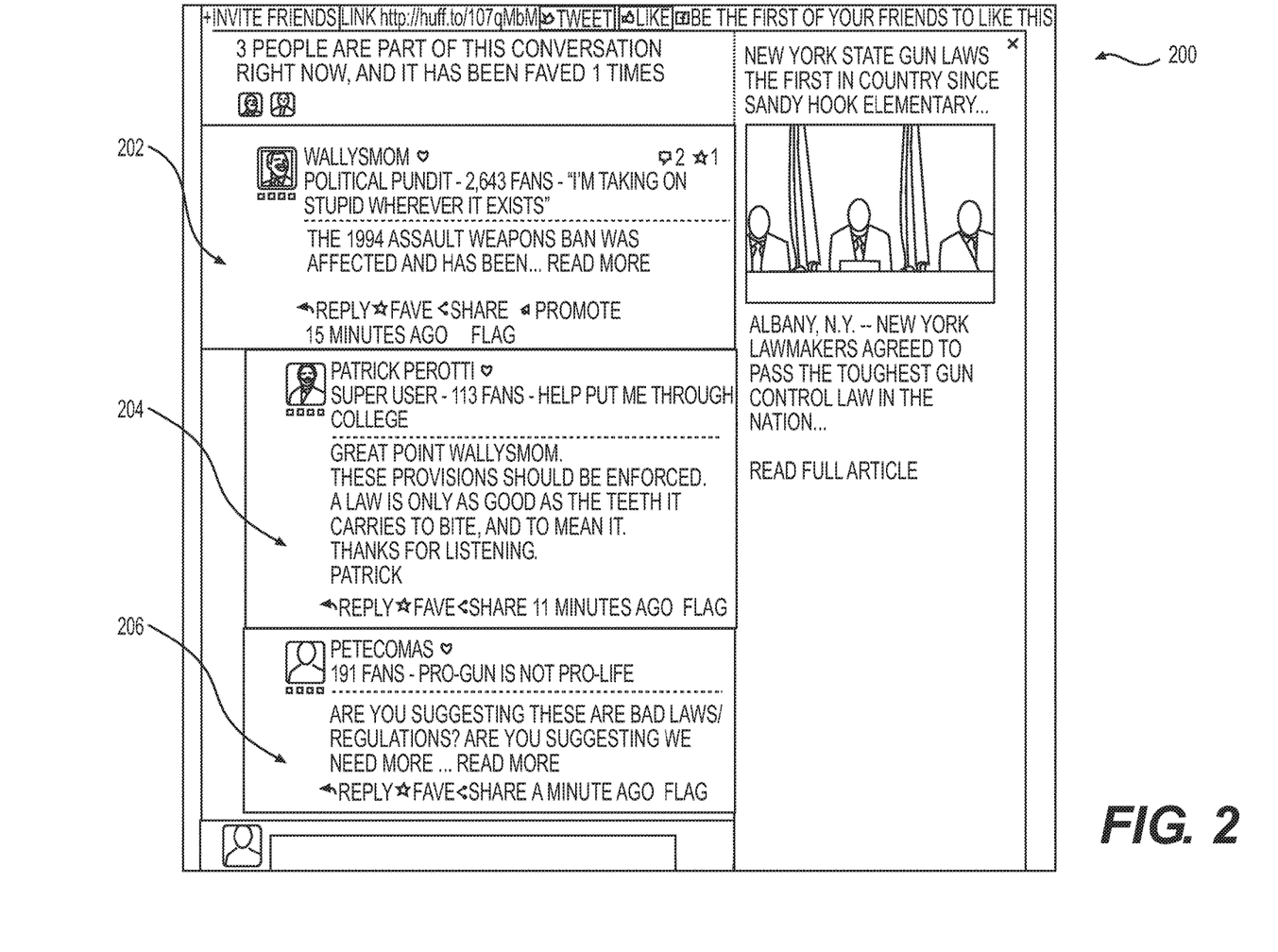
FIG. 2 is a screenshot of an existing user interface for processing and displaying user-generated content.

FIG. 2 is a screenshot of an exemplary user interface 200 for processing and displaying user-generated content. As shown in FIG. 2, in interfaces for generating, displaying, and organizing user-generated content, such as comments or messages, the content is typically displayed in sequential order and in un-nested conversations, Replies to user-generated content, such as comments and messages, are often indented to show that the comment is a reply to another comment. If the reply is indented by one unit or tab, then the reply might be a reply to an original or "parent" comment. If a reply is indented by two or more units or tabs, then the reply might be a reply to another reply. For example, in the exemplary user interface 200 of FIG. 2, comment 204 is indicated as a reply to the original or parent comment 202, because it is shown below and indented with respect to the parent comment. However, it is difficult to ascertain whether comment 206 is indented by one tab or two, and whether it is in reply to the original comment 202 or the reply comment 204. Regardless of the number or combination of original comments, in existing interfaces, replies to original comments, and/or replies to replies, any or all of those comments and replies may be displayed in sequential order based on the timestamp of the comment or reply (e.g., the time when the commenting server received the comment or reply from the respective user). As a result, it can be difficult for readers of comments to determine when a comment is a reply, and to identify which comment or reply a particular reply is in response to. In addition, it can be difficult for readers to identify important or interesting comments or conversations.

Figure 3A:
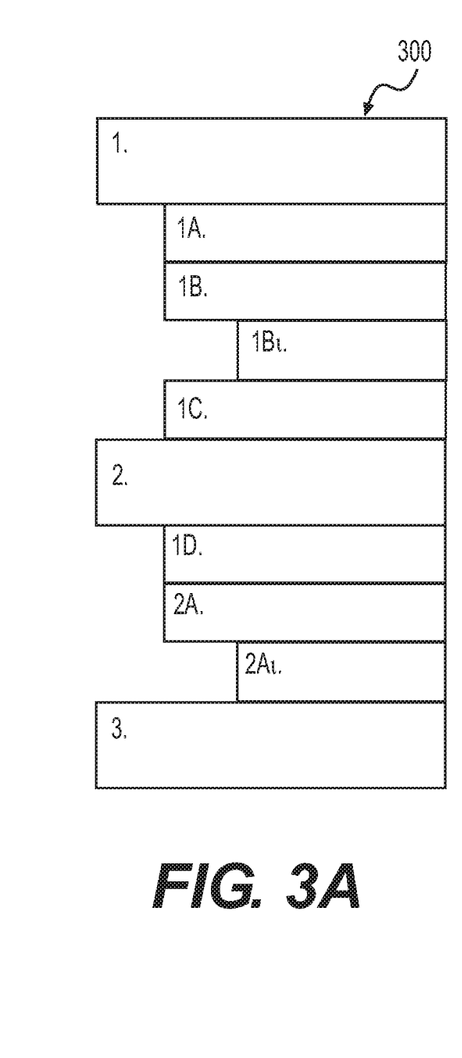
FIGS. 3A-3C are schematic diagrams of an exemplary technique for arranging user-generated content, such as comments, based on a hierarchical or logical structure or interface, according to an exemplary embodiment of the present disclosure.
Figure 3B:
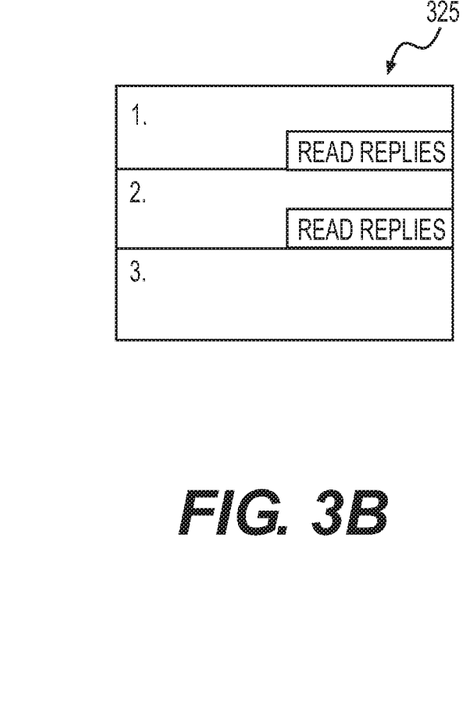
Figure 3C:
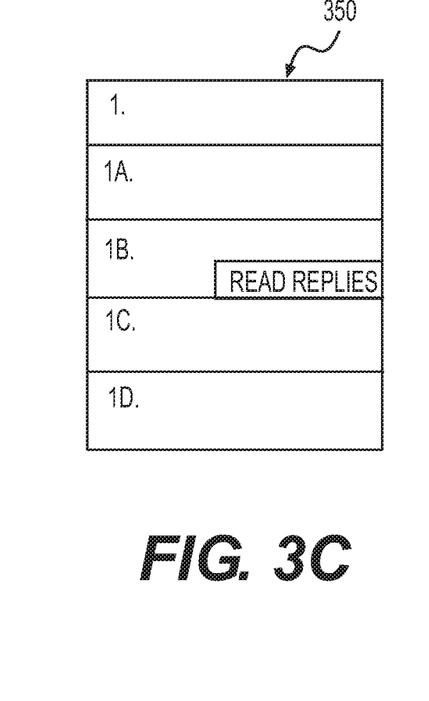

FIGS. 3A-3C are schematic diagrams of an exemplary technique for arranging user-generated content, such as comments, based on a hierarchical or logical structure or interface, according to an exemplary embodiment of the present disclosure. FIG. 3A shows an interface 300 having an exemplary series of comments and reply comments, which are arranged according to existing techniques. Specifically, reply comments 1A, 1B, 1C, and 1D are in response to original comment 1. Reply comment 1Bi is in response to reply comment 1B. Reply comment 2A is in response to original comment 2, and reply comment 2Ai is in response to reply comment 2A. Instead of arranging the comments and reply comments in sequential order and as being indented to reflect conversational relationships (as shown in FIG. 3A), the comments and reply comments may be arranged according to a more logical and/or hierarchical structure.

For example, as shown in interface 325 of FIG. 3B, initially, such as when a user first requests to view user-generated content (e.g., comments on an article, video, etc.), the user may be presented with original comments, in this case, original comments 1, 2, and 3. That is, initially, reply comments and replies to replies may be hidden from the user, so that the user can begin by scrolling or swiping through original comments to the displayed online content. In one embodiment, if one or more of the original comments was replied to, any type of user element may be presented that allows the user to selectively display and review those replies to the respective comment. For example, as shown in FIG. 3B, since original comments 1 and 2 have replies to them, the original comments 1 and 2 of interface 325 may display a user element (e.g., a link) that reads, for example, "Read Replies." By way of illustration, if a user selects a button or link to read the replies to comment 1, for example, then the interface may update or change to display the replies to comment 1. For example, as shown in FIG. 3C, interface 350 may be displayed to show the replies to comment 1, including replies 1A-1D. Again, following the same logic and hierarchical structure, since reply 1B has a reply (reply 1Bi), reply 1B may also display a "Read Replies" link or button, which a user can manipulate to display the replies to reply 1B, and so on. It should be appreciated that there is no limit to the number of layers or iterations of replies that may be nested and subsequently unpackaged or displayed to the user, based on the user's selective manipulation of the comments and replies.

Figure 4A:
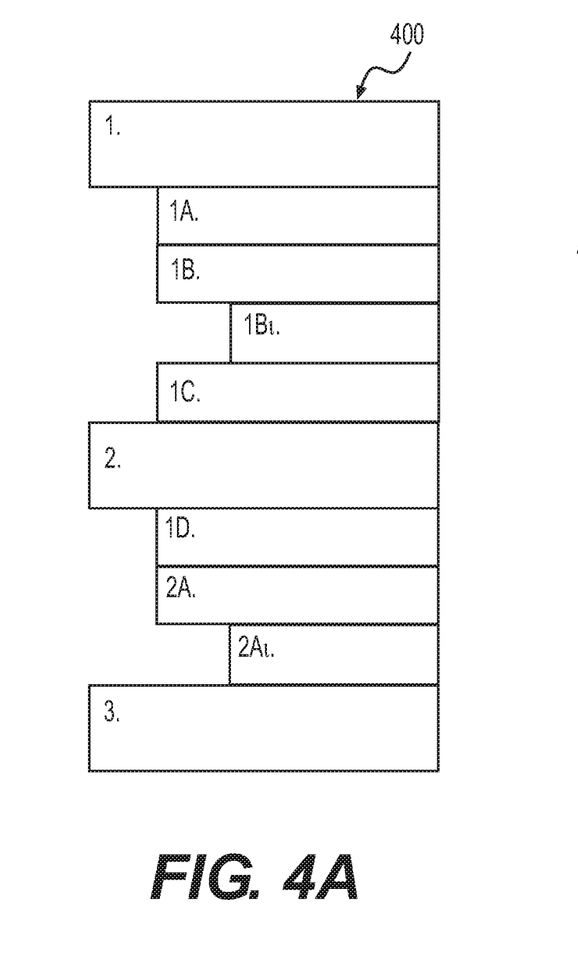
FIGS. 4A and 4B are schematic diagrams of another exemplary technique for arranging user-generated content, such as comments, based on a hierarchical or logical structure or interface, according to an exemplary embodiment of the present disclosure.
Figure 4B:
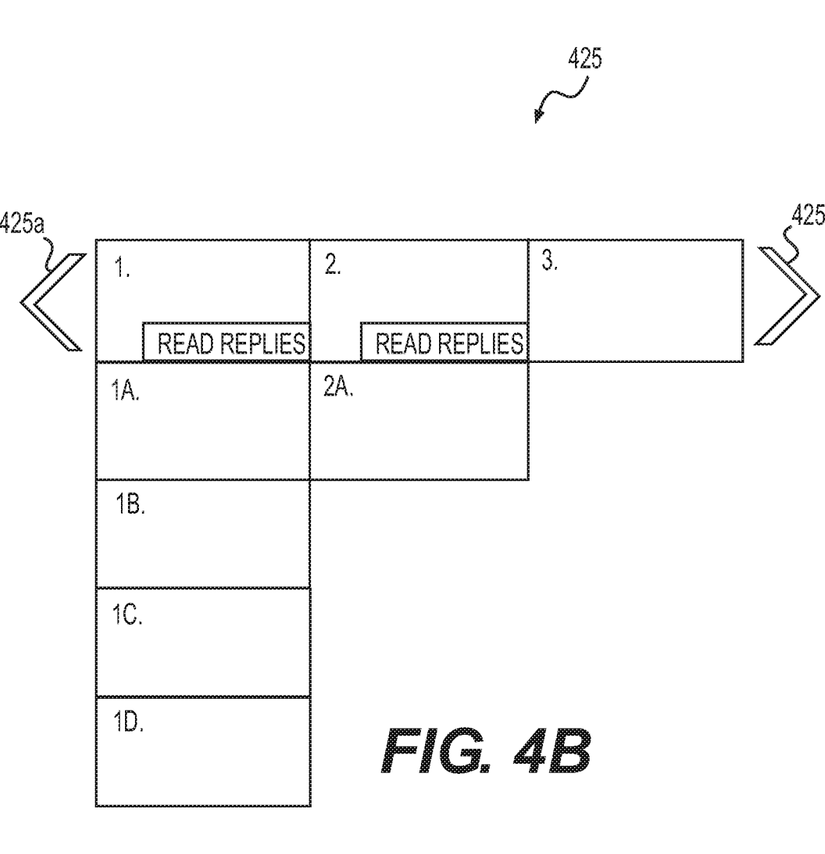

FIGS. 4A and 4B are schematic diagrams of another exemplary technique for arranging user-generated content, such as comments, based on a hierarchical or logical structure or interface, according to an exemplary embodiment of the present disclosure. Specifically, like FIG. 3A, FIG. 4A depicts an interface 400 having an exemplary series of comments and reply comments, which are arranged according to existing techniques. Specifically, reply comments 1A, 1B, 1C, and 1D are in response to original comment 1. Reply comment 1Bi is in response to reply comment 1B. Reply comment 2A is in response to original comment 2, and reply comment 2Ai is in response to reply comment 2A. Instead of arranging the comments and reply comments in sequential or temporal order and as being indented to reflect conversational relationships (as shown in FIG. 3A), the comments and reply comments may be arranged according to a more logical and/or hierarchical structure.

For example, as shown in interface 425 of FIG. 4B, a user may initially be presented with only one original comment at a time, such as one of comments 1, 2, or 3. The user may use arrow elements, a scroll bar, a keyboard, and/or a device touch screen to scroll left and right between the various original comments. For example, a user may use a mouse to click on left arrow 425a and/or right arrow 425b to change the display of one of comments 1, 2, or 3, the user may use the mouse to control a scroll bar to change the display of one of comments 1, 2, or 3, the user may use the arrow keys on a keyboard to change the display of one of comments 1, 2, or 3, and/or the user may swipe left and/or right on a touch screen to change the display of one of comments 1, 2, or 3.

Whenever the user is presented with an original comment to which one or more other users replied, the original comment may have appended thereto a "Read Replies" link or button, which a user can manipulate to display the replies to that comment. For example, if a user is viewing original comment 1 and selects to "Read Replies," then the replies (in this case replies 1A-1D) may appear below the original comment, and the user may use arrow elements 425a and 425b, a scroll bar, a keyboard, and/or a device touch screen to scroll up and down between the replies to original comment 1. If a user is viewing original comment 2 and selects to "Read Replies," then the replies (in this case reply 2A) may appear below the original comment, and the user may use arrow elements 425a and 425b, a scroll bar, a keyboard, and/or a device touch screen to scroll up and down between the replies to original comment 2. At any time, if one of the displayed replies received one or more replies, then, again, a user may select to "Read Replies," which may cause replies to the replies to appear in the orthogonal direction, which a user can again scroll or swipe through to view. Thus, as shown in the embodiments, of FIG. 4B, user-generated content, such as comments and messages, may be arranged in two-dimensional grids based on the relationships between various comments, replies, replies to replies, and so on.

Figure 5:
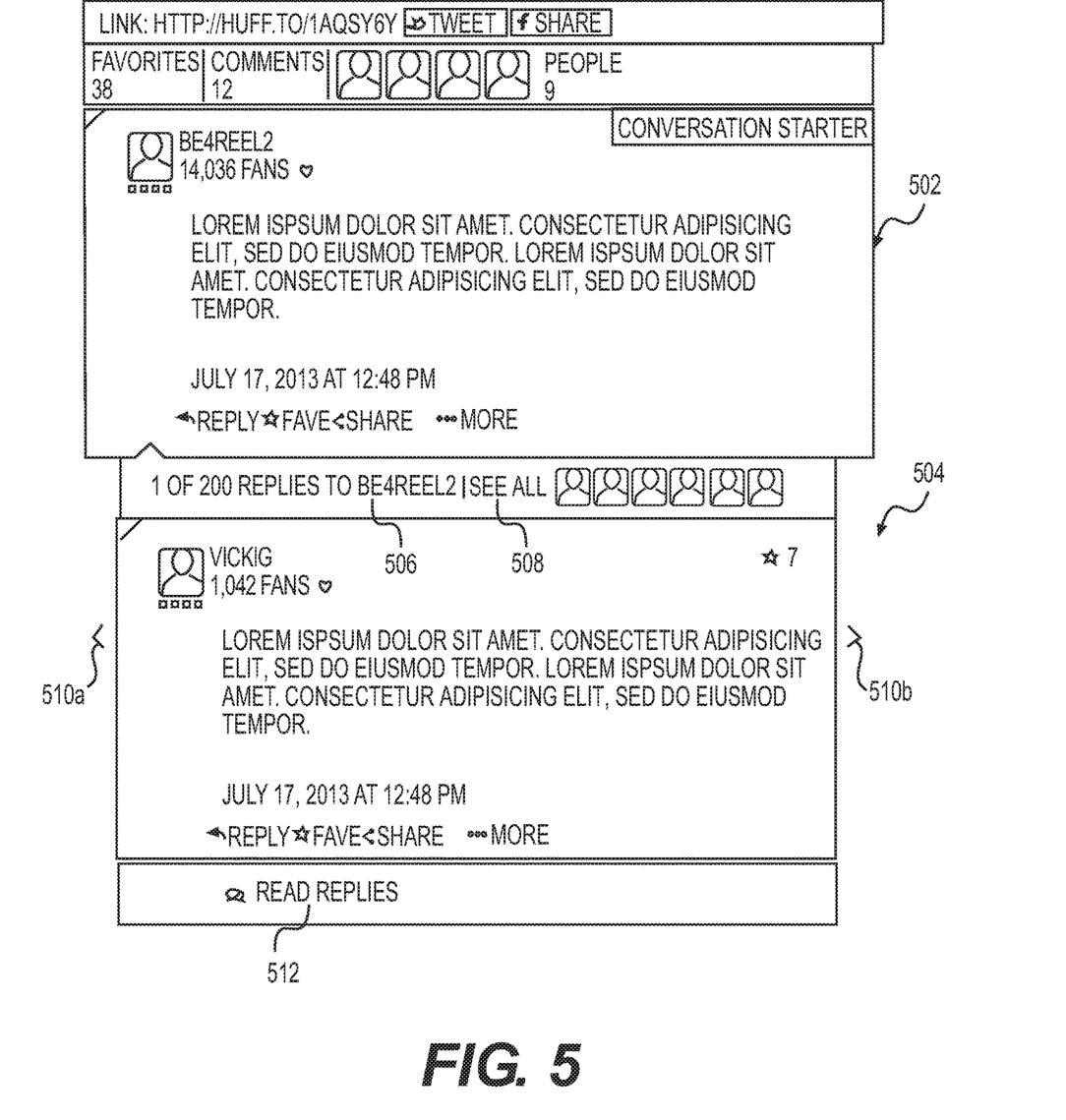
FIG. 5 is a screenshot of an exemplary user interface for arranging user-generated content, such as comments, based on a hierarchical or logical structure or interface, according to an exemplary embodiment of the present disclosure.

FIG. 5 is a screenshot of an exemplary user interface for arranging user-generated content, such as comments, based on a hierarchical or logical structure or interface, according to an exemplary embodiment of the present disclosure. For example, as shown in FIG. 5, an original comment 502 may be displayed. In this case, original comment 502 was generated and submitted for display on a website by a user having the username, BE4REEL2, as part of a "conversation" involving a total of twelve original comments among nine people.

The user-generated content, may be displayed or presented after the entire content in which the user-generated content is associated. Alternatively, the user-generated content may be displayed or presented in-line with the content in which the user-generated content is associated. As yet another alternative, the user-generated content maybe displayed separate from the content, the user-generated content maybe displayed before the entire content, before a line of content, or after a line of content in which the user-generated content is associated.

As shown in FIG. 5, consistent with the present disclosure and the embodiments of FIGS. 3B-3C, an interface may display one of the replies to the original comment 502. In this case, the screenshot of FIG. 5 is depicting a first reply comment 504, which is indicated by indicia 506 as being the first ("1") of 200 replies to the original comment 502 by user BE4REEL2. As shown in FIG. 5, a user viewing original comment 502 and reply comment 504 may cycle between and among the 200 replies to the original BE4REEL2 comment 502, by manipulating one or more scrolling elements 510a and 510b. A user may use a mouse to click on left arrow 510a and/or right arrow 510b to change the reply displayed, the user may use the mouse to control a scroll bar to change the reply displayed, the user may use the arrow keys on a keyboard to change the reply displayed, and/or the user may swipe left and/or right on a touch screen to change the reply displayed. Of course, the user may cycle between and among the replies to the original comment 502 using any suitable user interface or UI device, such as a mouse, keyboard, touchscreen, and so on.

As shown in FIG. 5, the reply comment 504 may include a "See All" link or other user element 508, which a user may manipulate to display all 200 replies to the original comment 502. In other words, when a user selects an element such as "See All" element 508, the interface may display all of the replies that exist in the same hierarchy as the comment or reply containing that element. So, in this case, selecting "See All" element 508 will reveal, in addition to VICKIG's reply to BE4REEL2, all of the remaining 199 replies of the 200 total replies to original comment 502.

As shown in FIG. 5, the reply comment 504 may also include a "Read Replies" link or other user element 512, which a user may manipulate to display the replies to the reply comment 504. In other words, when a user selects an element such as the "Read Replies" element 512, the interface may display all of the replies to the comment or reply containing the "Read Replies" element. So, in this case, selecting "Read Replies" element 512 will reveal one or more of the replies to the reply comment 504 by VICKIG.

Figure 6:
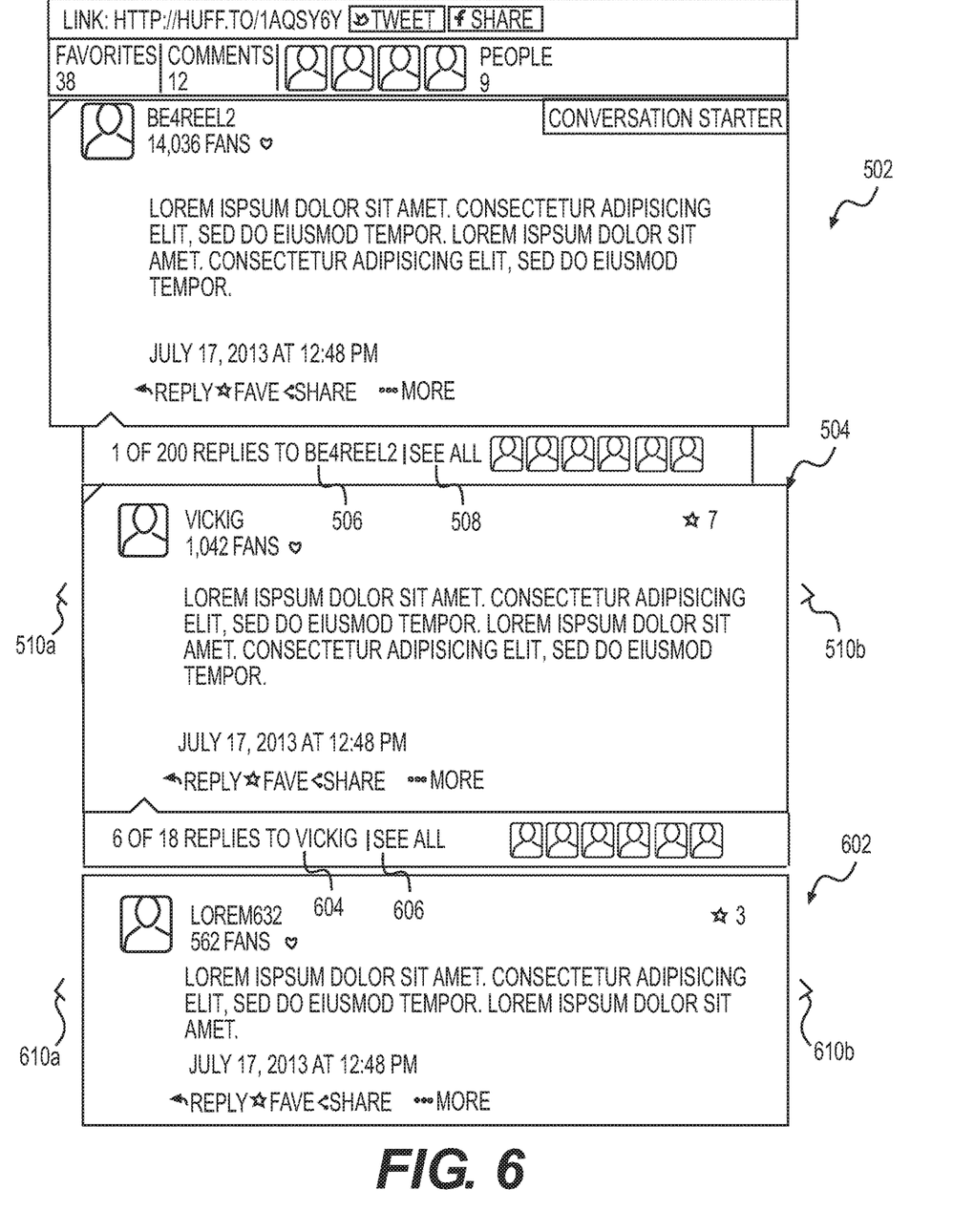
FIG. 6 is another screenshot of an exemplary user interface for arranging user-generated content, such as comments, based on a hierarchical or logical structure or interface, according to an exemplary embodiment of the present disclosure.

FIG. 6 is another screenshot of an exemplary user interface for arranging user-generated content, such as comments, based on a hierarchical or logical structure or interface. Specifically, FIG. 6 depicts a screenshot of an exemplary interface that may be displayed after a user has selected "Read Replies" element 512 of FIG. 5. Specifically, as shown in FIG. 6, upon requesting to view the replies to reply comment 504 by VICKIG, the interface may display one or more of the replies to that comment. In this case, as indicated by the indicia 604, the user interface is displaying the sixth of the eighteen total replies to VICKIG's reply comment 504. As with the reply comment 504, the reply to the reply, i.e., reply 602, may display similar user elements to move between same-level replies and/or to display additional layers of replies. In one embodiment, a user may select one or more scrolling elements 610a, 610b to scroll between and among the eighteen replies to VICKIG. A user may use a mouse to click on left arrow 610a and/or right arrow 610b to change the reply displayed, the user may use the mouse to control a scroll bar to change the reply displayed, the user may use the arrow keys on a keyboard to change the reply displayed, and/or the user may swipe left and/or right on a touch screen to change the reply displayed. Of course, the user may cycle between and among the replies to the reply comment 504 using any suitable user interface or UI device, such as a mouse, keyboard, touchscreen, and so on.

Alternatively, a user may select an element such as "See All" element 606 to request that the interface display all of the replies that exist in the same hierarchy as the comment or reply containing that element. So, in this case, selecting "See All" element 606 will reveal, in addition to LOREM632's reply to VICKIG, all of the remaining seventeen replies of the eighteen total replies to reply comment 504.

Figure 7:
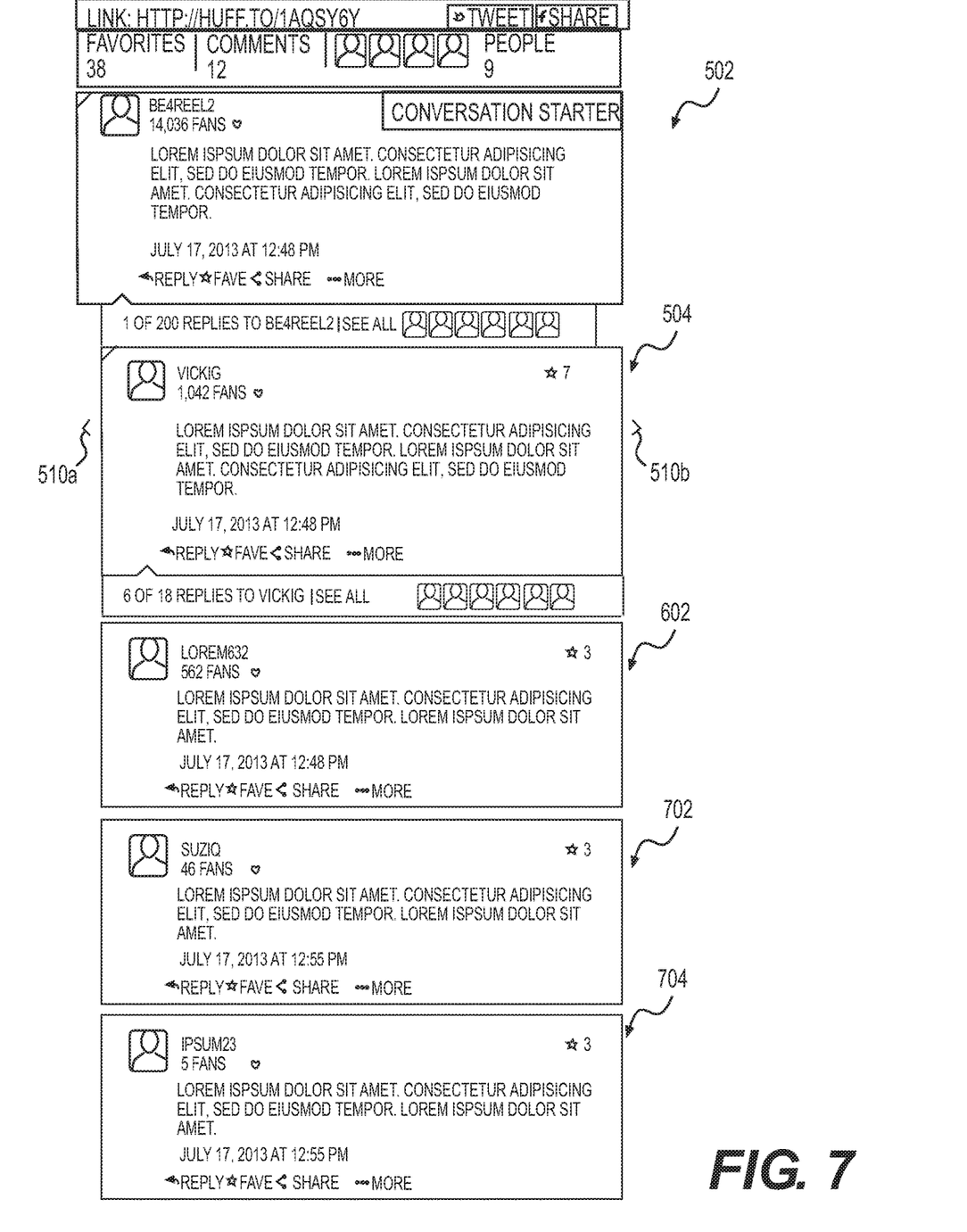
FIG. 7 is yet another screenshot of an exemplary user interface for arranging user-generated content, such as comments, based on a hierarchical or logical structure or interface, according to an exemplary embodiment of the present disclosure.

FIG. 7 depicts an exemplary screenshot of the interface after a user has selected the "See All" element 606 (discussed above with respect to FIG. 6), where the interface may display all eighteen of the replies to the reply comment 504 by VICKIG. Specifically, the screenshot of FIG. 7 depicts three of the eighteen replies to VICKIG, namely, reply 602 by LOREM632, reply 702 by SUZIQ, and reply 704 by IPSUM23. Of course, while they do not appear in the screenshot of FIG. 7, the interface may be displaying the remainder of the eighteen total replies below a page break or scroll line in the display.

Figure 8:
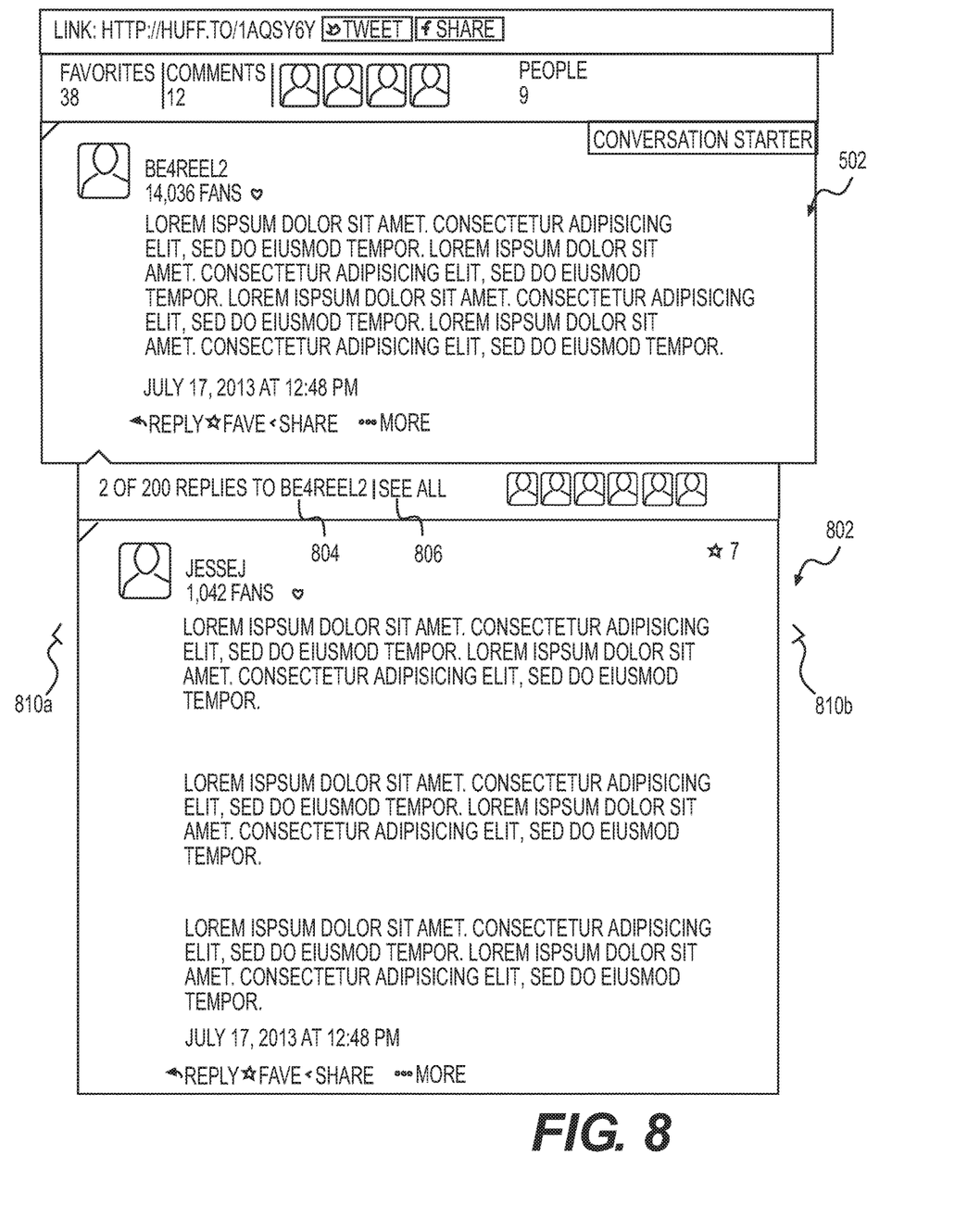
FIG. 8 is yet another screenshot of an exemplary user interface for arranging user-generated content, such as comments, based on a hierarchical or logical structure or interface, according to an exemplary embodiment of the present disclosure.

Regardless of where a user is positioned within an arrangement of user content, a user may manipulate the interface to "go up" a level in comments, e.g., to hide one or more replies, or replies to replies. For example, whether the user is at the position of FIG. 6 (and viewing only LOREM632's reply to VICKIG) or of FIG. 7 (and viewing all replies to VICKIG), the user can manipulate the interface to hide VICKIG's reply and the replies corresponding to VICKIG's reply. For example, a user can manipulate one or more of user elements 510a, and 510b, or other scroll bars or arrows (or user input mechanisms, such as a touchscreen), to move between other replies to the original comment 502. For example, as shown in FIG. 8, a user may have interacted with user elements 510a, 510b once (or swiped to the left or right once on a touch device) to advance to the next of the two hundred replies to the original comment 502 by BE4REEL2. Specifically, as indicated by the indicia 804, FIG. 8 depicts a screenshot of the interface displaying the second reply 802 ("2") of the two hundred replies to the original comment 502 by BE4REEL2, which in this case is a reply 802 by a user with the username, JESSEJ. As described above with respect to the interfaces of FIGS. 5-7, a user may select a "See All" link or other user element 806, which a user may manipulate to display all two hundred replies to the original comment 502. In other words, when a user selects an element such as "See All" element 806, the interface may display all of the replies that exist in the same hierarchy as the comment or reply containing that element. So, in this case, selecting "See All" element 806 will reveal, in addition to JESSEJ's reply to BE4REEL2, all of the remaining 199 replies of the two hundred total replies to original comment 502. In addition, as shown in FIG. 8, a user viewing original comment 502 and reply comment 808 may cycle between and among the 200 replies to the original BE4REEL2 comment 502, by manipulating one or more scrolling elements 810*a*, 810*b*. A user may use a mouse to click on left arrow 810*a* and/or right arrow 810*b* to change the reply displayed, the user may use the mouse to control a scroll bar to change the reply displayed, the user may use the arrow keys on a keyboard to change the reply displayed, and/or the user may swipe left and/or right on a touch screen to change the reply displayed. Of course, the user may cycle between and among the replies to the original comment 502 using any suitable user interface or UI device, such as a mouse, keyboard, touchscreen, and so on.

Although not depicted in FIG. 8, if one or more users replied to the reply comment 802, then the reply comment 802 may also include a "Read Replies" link or other user element, which a user may manipulate to display the replies to the reply comment 802. In other words, when a user selects an element such as the "Read Replies" element, the interface may display all of the replies to the comment or reply containing the "Read Replies" element, i.e., the one or more of the replies to the reply comment 802 by JESSEJ, to the extent they have been generated by any users.

Accordingly, the presently disclosed systems and methods enable comments to be displayed hierarchically or otherwise logically based on their relationships with one another. Instead of just indenting or otherwise spatially offsetting replies and replies-to-replies based on how many levels deep the reply relates to, the present disclosure describes more user friendly techniques for displaying replies to the extent requested and desired by the user. For example, the user can selectively display only parent or original comments, if desired. The user can selectively display one reply at a time for a particular parent or original comment. Alternatively, the user can selectively display all of the replies to particular parent or original comment or reply. Moreover, the presently disclosed systems and methods provide a commenting interface that is more user friendly, both in desktop/laptop environments and especially in mobile environments, which typically involve smaller, but touch-sensitive, screens. Because the presently disclosed systems and methods provide logically arranged comments, entire comments can be displayed without narrowing or otherwise compromising the display of a comment to reflect its relationship with other comments.

In one embodiment, the user may be presented with hyperlinks or a search bar in which the user may type one or more keywords, or the user may click on or otherwise select a word that appears in the content associated with one or more comments. Doing so may cause only those comments having that keyword in the comment to appear in the comments section of a web page. Alternatively or additionally, comments may be sorted based on how many times the selected keyword appears in those comments. This technique may be incorporated in or used in addition to the above-described logical or hierarchical techniques for presenting comments of particular interest to a user or reader of electronic content.

Figure 9:
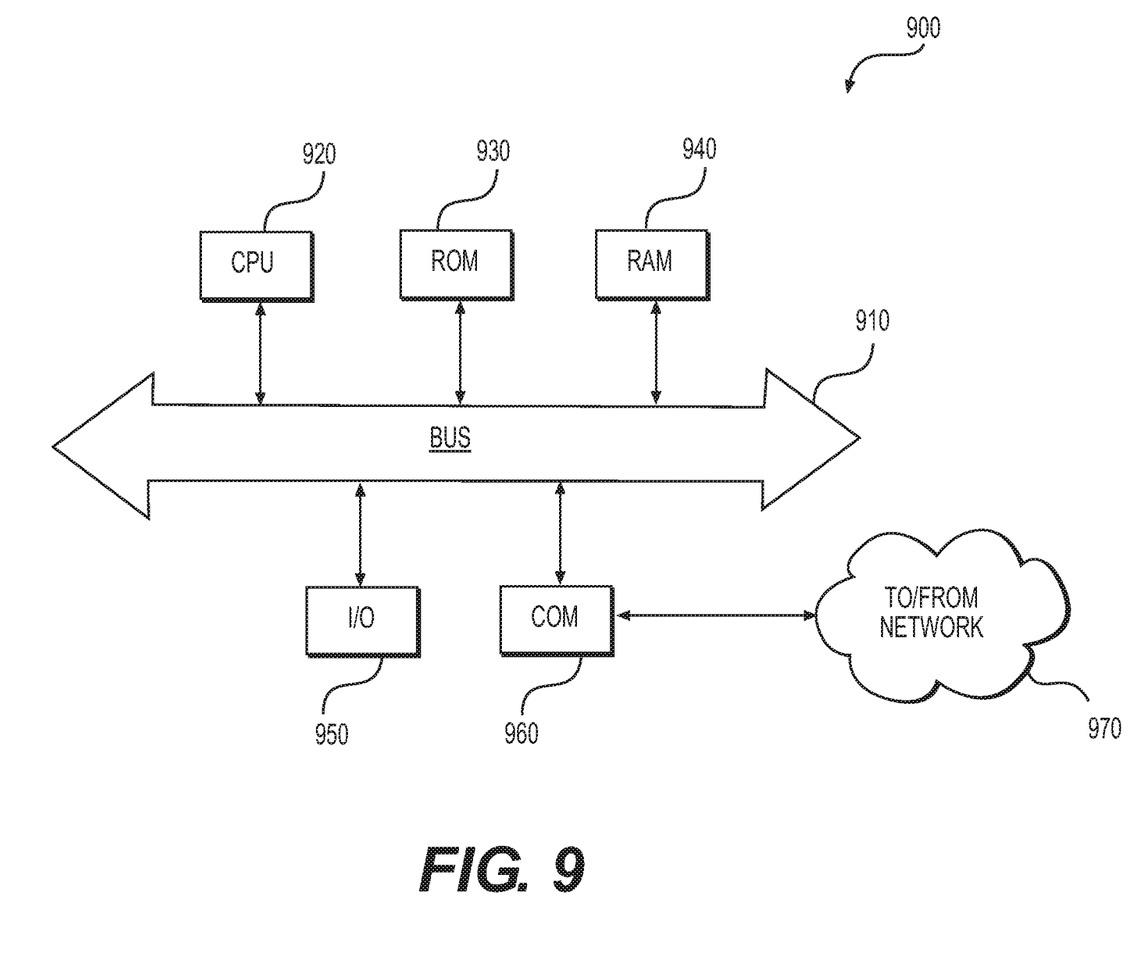
FIG. 9 is a simplified functional block diagram of a computer or server system that may be configured as a host server, for example, for arranging user-generated content, such as comments, based on a hierarchical or logical structure or interface, or as a computer or mobile device, for example, for generating and/or interacting with user-generated content, such as comments.

FIG. 9 is a simplified functional block diagram of a computer or server system that may be configured as a host server, for example, for arranging user-generated content, such as comments, based on a hierarchical or logical structure or interface, or as a computer or mobile device, for example, for generating and/or interacting with user-generated content, such as comments. Specifically, FIG. 9 illustrates a network or host computer platform 900, as may typically be used to implement a server like the commenting server systems 106. It is believed that those skilled in the art are familiar with the structure, programming and general operation of such computer equipment and as a result the drawings should be self-explanatory.

A platform for a server or the like 900, for example, may include a data communication interface for packet data communication 960. The platform may also include a central processing unit (CPU) 920, in the form of one or more processors, for executing program instructions. The platform typically includes an internal communication bus 910, program storage and data storage for various data files to be processed and/or communicated by the platform such as ROM 930 and RAM 940, although the server 900 often receives programming and data via network communications 970. The hardware elements, operating systems and programming languages of such equipment are conventional in nature, and it is presumed that those skilled in the art are adequately familiar therewith. The server 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing an online interface for displaying hierarchically or logically arranged user-generated content, the method comprising:
   receiving, from a first user over a network, first topical user-generated electronic content, the first topical user-generated electronic content being related to a topic of a web page;
   displaying the first topical user-generated electronic content received from the first user on the web page;
   receiving, from a second user over the network, responsive user-generated electronic content;
   withholding the entirety of the responsive user-generated electronic content from display;
   displaying, adjacent to the first topical user-generated electronic content on the web page, a user element or link that a third user can manipulate to display the withheld responsive user-generated electronic content, the withheld responsive user-generated electronic content being displayed adjacent to the first topical user-generated electronic content;
   receiving, from the third user over the network, a first response to the responsive user-generated electronic content;
   receiving, from the third user over the network, a second topical user-generated electronic content, the second topical user-generated electronic content being related to the topic of the web page; and
   displaying, adjacent to the first topical user-generated electronic content on the web page, the second topical user-generated electronic content.

2. The method of claim 1, further comprising:
   displaying the first topical user-generated electronic content and the second topical user-generated electronic content as having the same width.

3. The method of claim 1, further comprising:
   receiving, from the second user over the network, an indication of a desire to post the responsive user-generated electronic content on the web page in association with the first topical user-generated electronic content;
   storing the responsive user-generated electronic content and the indication of a desire to post the responsive user-generated electronic content on the web page in association with the first topical user-generated electronic content; and
   upon receiving from the third user a manipulation of the user element or link, displaying the responsive user-generated electronic content adjacent to the first topical user-generated electronic content.

4. The method of claim 1, wherein the user-generated content is a textual-based comment.

5. The method of claim 1, further comprising displaying the user-generated content in relation to an associated content item.

6. The method of claim 5, wherein the associated content item is an online article, online video, or online audio file.

7. The method of claim 5, wherein the user-generated content is sorted, highlighted, or distinguished based on a score.

8. The method of claim 7, wherein the score is calculated based on one or more of a demographic associated with the user, an activity level of the conversation, and a number of participants in the conversation.

9. The method of claim 1, wherein the response to the responsive user-generated electronic content and the responsive user-generated electronic content are displayed on the web page in a width that matches a width of the first topical user-generated electronic content.

10. A system for providing an online interface for displaying hierarchically or logically arranged user-generated content, the system comprising:
    a memory device storing instructions for providing an online interface for displaying hierarchically or logically arranged user-generated content; and
    a processor configured to execute the instructions to perform a method of:
    receiving, from a first user over a network, first topical user-generated electronic content, the first topical user-generated electronic content being related to a topic of a web page;
    displaying the first topical user-generated electronic content received from the first user on the web page;
    receiving, from a second user over the network, responsive user-generated electronic content;
    withholding the entirety of the responsive user-generated electronic content from display;
    displaying, adjacent to the first topical user-generated electronic content on the web page, a user element or link that a third user can manipulate to display the withheld responsive user-generated electronic content, the withheld responsive user-generated electronic content being displayed adjacent to the first topical user-generated electronic content;
    receiving, from the third user over the network, a first response to the responsive user-generated electronic content;
    receiving, from the third user over the network, a second topical user-generated electronic content, the second topical user-generated electronic content being related to the topic of the web page; and
    displaying, adjacent to the first topical user-generated electronic content on the web page, the second topical user-generated electronic content.

11. The system of claim 10, wherein the processor is further configured for:
    displaying the first topical user-generated electronic content and the second topical user-generated electronic content as having the same width.

12. The system of claim 10, wherein the processor is further configured for:
    receiving, from the second user over the network, an indication of a desire to post the responsive user-generated electronic content on the web page in association with the first topical user-generated electronic content;
    storing the responsive user-generated electronic content and the indication of a desire to post the responsive user-generated electronic content on the web page in association with the first topical user-generated electronic content; and
    upon receiving from the third user a manipulation of the user element or link, displaying the responsive user-generated electronic content adjacent to the first topical user-generated electronic content.

13. The system of claim 10, wherein the user-generated content is a textual-based comment.

14. The system of claim 10, wherein the processor is further configured for: displaying the user-generated content in relation to an associated content item.

15. The system of claim 14, wherein the associated content item is an online article, online video, or online audio file.

16. The system of claim 14, wherein the user-generated content is sorted, highlighted, or distinguished based on a score.

17. The system of claim 16, wherein the score is calculated based on one or more of a demographic associated with the user, an activity level of the conversation, and a number of participants in the conversation.

18. The method of claim 10, wherein the first response to the responsive user-generated electronic content and the responsive user-generated electronic content are displayed on the web page in a width that does not match a width of the first topical user-generated electronic content.

19. A non-transitory machine-readable medium storing instructions that, when executed by a computing system, causes the computing system to perform a method for providing an online interface for displaying hierarchically or logically arranged user-generated content, the method including:

receiving, from a first user over a network, first topical user-generated electronic content, the first topical user-generated electronic content being related to a topic of a web page;

displaying the first topical user-generated electronic content received from the first user on the web page;

receiving, from a second user over the network, responsive user-generated electronic content;

withholding the entirety of the responsive user-generated electronic content from display;

displaying, adjacent to the first topical user-generated electronic content on the web page, a user element or link that a third user can manipulate to display the withheld responsive user-generated electronic content, the withheld responsive user-generated electronic content being displayed adjacent to the first topical user-generated electronic content;

receiving, from the third user over the network, a first response to the responsive user-generated electronic content;

receiving, from the third user over the network, a second topical user-generated electronic content, the second topical user-generated electronic content being related to the topic of the web page; and     displaying, adjacent to the first topical user-generated electronic content on the web page, the second topical user-generated electronic content.

20. The non-transitory machine-readable medium of claim 19, the method further comprising:

receiving, from the second user over the network, an indication of a desire to post the responsive user-generated electronic content on the web page in association with the first topical user-generated electronic content;

storing the responsive user-generated electronic content and the indication of a desire to post the responsive user-generated electronic content on the web page in association with the first topical user-generated electronic content; and     upon receiving from the third user a manipulation of the user element or link, displaying the responsive user-generated electronic content adjacent to the first topical user-generated electronic content.

\* \* \* \* \*